United States Patent
Narita et al.

(10) Patent No.: US 10,095,404 B2
(45) Date of Patent: Oct. 9, 2018

(54) TOUCH BASED ASSOCIATION OF MULTIPLE COMPUTING DEVICES

(71) Applicant: GungHo Online Entertainment, Inc., Tokyo (JP)

(72) Inventors: Ken Narita, Tokyo (JP); Kazuki Morishita, Tokyo (JP)

(73) Assignee: GungHo Online Entertainment, Inc., Tokyo (JP)

( * ) Notice: Subject to any disclaimer, the term of this patent is extended or adjusted under 35 U.S.C. 154(b) by 332 days.

(21) Appl. No.: 14/944,026

(22) Filed: Nov. 17, 2015

(65) Prior Publication Data

US 2016/0378329 A1 Dec. 29, 2016

Related U.S. Application Data

(63) Continuation of application No. PCT/JP2015/068670, filed on Jun. 29, 2015.

(51) Int. Cl.
  *G06F 15/173* (2006.01)
  *G06F 3/0488* (2013.01)
  (Continued)

(52) U.S. Cl.
  CPC ........ *G06F 3/04883* (2013.01); *H04W 4/001* (2013.01); *H04W 4/50* (2018.02);
  (Continued)

(58) Field of Classification Search
  None
  See application file for complete search history.

(56) References Cited

U.S. PATENT DOCUMENTS 8,534,555 B1 * 9/2013 Sweet ................. G06K 7/084
                                                            235/376
9,207,860 B2 * 12/2015 Rydenhag ........... G06F 3/04883
(Continued)

FOREIGN PATENT DOCUMENTS

JP   2010-534443    11/2010
JP   2012-208720 A  10/2012
(Continued)

OTHER PUBLICATIONS

Japanese Office Action in JP Patent Application No. 2015-532228, dated Oct. 4, 2016, in 8 pages.
(Continued)

*Primary Examiner* — Razu A Miah
(74) *Attorney, Agent, or Firm* — Knobbe, Martens, Olson & Bear, LLP

(57) ABSTRACT

To provide a server device with which the burden of processing can be reduced during generation of relationship information among multiple terminal devices. The server device can include a communication unit for communicating with a first terminal device having a first touch panel, and with a second terminal device having a second touch panel; and a controller for determining whether an interval of time that is identified on the basis of first operation information received from the first terminal device via the communication unit and corresponding to a first swipe operation performed on the first touch panel, and second operation information received from the second terminal device via the communication unit and corresponding to a second swipe operation performed on the second touch panel, falls within a prescribed range, and for generating prescribed relationship information on the basis of the result of the determination.

10 Claims, 12 Drawing Sheets

(51) Int. Cl.
*H04W 4/50* (2018.01)
*H04W 4/00* (2018.01)
H04L 29/08 (2006.01)
H04L 29/06 (2006.01)

(52) U.S. Cl.
CPC ........ *H04L 29/06* (2013.01); *H04L 29/08072* (2013.01); *H04L 29/08144* (2013.01)

(56) References Cited

U.S. PATENT DOCUMENTS

| | | | |
|---|---|---|---|
| 2003/0084162 A1* | 5/2003 | Johnson | H04L 29/06 709/227 |
| 2009/0265470 A1* | 10/2009 | Shen | G06F 1/1694 709/227 |
| 2010/0131592 A1* | 5/2010 | Zhang | G06F 9/5044 709/203 |
| 2010/0262696 A1 | 10/2010 | Oshiba | |
| 2012/0249415 A1 | 10/2012 | Nakajima et al. | |
| 2012/0322560 A1 | 12/2012 | Joo | |
| 2014/0025847 A1* | 1/2014 | Choi | H04L 67/06 710/33 |
| 2014/0149859 A1* | 5/2014 | Van Dyken | H04W 4/21 715/702 |
| 2014/0149881 A1* | 5/2014 | Cheng | H04W 4/21 715/748 |
| 2014/0186050 A1* | 7/2014 | Oshima | H04B 10/1143 398/118 |
| 2014/0258880 A1* | 9/2014 | Holm | H04L 65/40 715/748 |
| 2014/0273957 A1* | 9/2014 | Reitz | H04W 4/008 455/411 |
| 2014/0282045 A1* | 9/2014 | Ayanam | G06F 3/0484 715/740 |
| 2014/0344446 A1* | 11/2014 | Rjeili | H04L 43/04 709/224 |
| 2015/0081823 A1 | 3/2015 | Gao et al. | |
| 2015/0261432 A1* | 9/2015 | Yamamoto | G06F 3/04886 715/771 |
| 2015/0312275 A1* | 10/2015 | Grosskopf | H04L 63/20 726/1 |
| 2016/0170599 A1* | 6/2016 | Guegan | G06F 3/04845 715/748 |
| 2017/0094023 A1* | 3/2017 | Jack | H04L 67/34 |
| 2017/0357317 A1* | 12/2017 | Chaudhri | G06F 3/016 |

FOREIGN PATENT DOCUMENTS

| | | |
|---|---|---|
| JP | 2014239667 A | 12/2014 |
| JP | 2015088898 A | 5/2015 |
| WO | WO 2009060863 A1 | 5/2009 |

OTHER PUBLICATIONS

International Search Report (ISR) of PCT/JP2015/068670 dated Jun. 29, 2015.
Takahiro Murase, Information Processing Society of Japan, Mar. 6, 2012, pp. 4-371 to 4-372.
Japanese Office Action in JP Application No. 2015-532228, dated Jun. 14, 2016, in 4 pages.

* cited by examiner

TOUCH BASED ASSOCIATION OF MULTIPLE COMPUTING DEVICES

TECHNICAL FIELD

The present invention relates to a terminal device, with which it is possible to generate prescribed relationship information on the basis of prescribed operations performed on a first touch panel of a first terminal device and on a second touch panel of a second terminal device.

BACKGROUND

The feature of establishing a prescribed relationship (e.g., one of authentication) and exchanging various kinds of information by various methods between smartphones or other such terminal devices provided with a display unit, such as a liquid crystal display, and with a touch panel arranged covering the display unit, is known in the prior art.

For example, Patent Reference 1 discloses a feature whereby a server device mediates a process for generating relationship information between terminal devices (authentication). Specifically, the server device, upon receiving an authentication request for another user from a terminal device (a friend registration request), references a prescribed database, and searches for the user to be registered as a friend. An invitation is then sent to the terminal device of this target user, and a process prompting the user to join a prescribed service is carried out. Then, once the user in question joins the service, authentication is established for the first time, and the user is registered as a friend.

PRIOR ART REFERENCES

Patent References

Patent Reference 1: Japanese Laid-Open Patent Application 2014-239967

SUMMARY

However, in server devices of the prior art, it has been necessary to carry out various processes, such as searching a database, sending an invitation, issuing a prompt to join a service, and the like, before the relationship information can be generated. For users as well, it has been necessary to input information of various kinds on an as-needed basis to a terminal device while holding the device, which is burdensome.

Through the various aspects of the present invention, there is provided a server device or terminal device with which the burden of processing can be reduced, during generation of prescribed relationship information. A reduction in the burden on the users, in terms of having to input various types of information and the like, is provided as well.

The server device according to one aspect of the present invention is a server device that comprises: a communication unit for communicating with a first terminal device having a first touch panel operable by a first user, and with a second terminal device having a second touch panel operable by a second user different from the first user; and a controller for determining whether an interval of time that is identified on the basis of first operation information received from the first terminal device via the communication unit and corresponding to a first swipe operation performed on the first touch panel, and second operation information received from the second terminal device via the communication unit and corresponding to a second swipe operation performed on the second touch panel, falls within a prescribed range, and that generates prescribed relationship information on the basis of the result of the determination.

The terminal device according to another aspect of the present invention is a terminal device that comprises: a first touch panel operable by a first user; a communication unit for communicating with another terminal device having a second touch panel operable by a second user different from the first user; and a controller for determining whether an interval of time that is identified on the basis of first operation information corresponding to a first swipe operation performed on the first touch panel, and second operation information received from the other terminal device via the communication unit and corresponding to a second swipe operation performed on the second touch panel, falls within a prescribed range, and for generating prescribed relationship information on the basis of the result of the determination.

The non-transitory computer-readable medium in which a computer program according to one aspect of the present invention is stored, the computer program is causing a computer to function as: a communication unit for communicating with a first terminal device having a first touch panel operable by a first user, and with a second terminal device having a second touch panel operable by a second user different from the first user; and a controller for determining whether an interval of time that is identified on the basis of first operation information received from the first terminal device via the communication unit and corresponding to a first swipe operation performed on the first touch panel, and second operation information received from the second terminal device via the communication unit and corresponding to a second swipe operation performed on the second touch panel, falls within a prescribed range, and for generating prescribed relationship information on the basis of the result of the determination.

The method according to one aspect of the present invention is a method for generating prescribed relationship information in a server device that is connected, via a communication unit, to a first terminal device having a first touch panel operable by a first user, and to a second terminal device having a second touch panel operable by a second user different from the first user, wherein the method comprises a step in which the controller of the server device determines whether an interval of time that is identified on the basis of first operation information received from the first terminal device via the communication unit and corresponding to a first swipe operation performed on the first touch panel, and second operation information received from the second terminal device via the communication unit and corresponding to a second swipe operation performed on the second touch panel, falls within a prescribed range, and a step in which the controller of the server device generates the prescribed relationship information on the basis of the result of the determination.

Through the various aspects of the present invention, there is provided a server device or terminal device with which the burden of processing can be reduced, when generating prescribed relationship information. A reduction in the burden on the users, in terms of having to input various types of information and the like, is provided as well.

DETAILED DESCRIPTION

Figure 1:
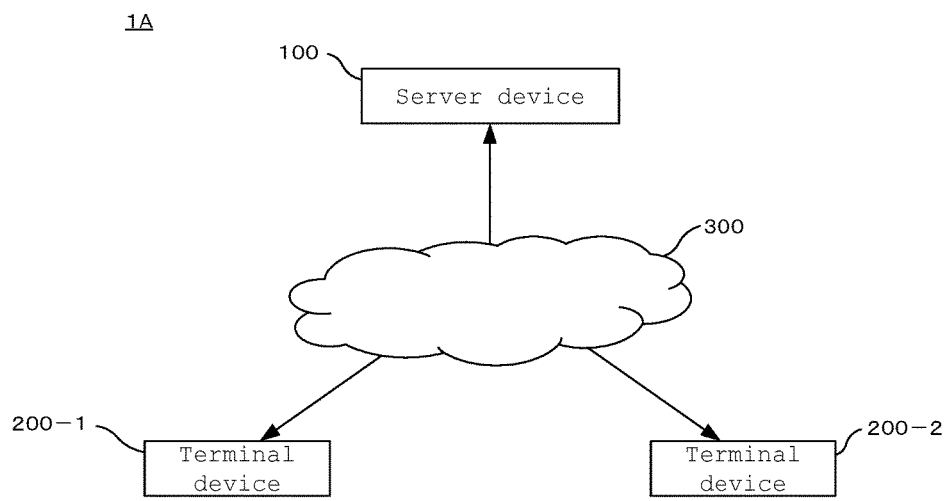
FIG. 1 is a diagram showing the configuration of a system 1A according to a first embodiment of the present invention.

The embodiments of the present invention shall be described with reference to the accompanying drawings. Common constituent elements in the drawings have been assigned identical reference symbols.

<Overview of the Embodiments of the Present Invention>

In the several embodiments of the present invention, prescribed relationship information is generated on the basis of a swipe operation detected on a touch panel provided to a terminal device, and a swipe operation detected on a touch panel provided to another terminal device, and occurring before a prescribed time after the swipe operation in question has passed.

One example of the relationship information employed in the embodiments of the present invention is information indicating a relationship among multiple terminal devices, or users operating the terminal devices, which are identified on the basis of swipe operations carried out among multiple terminal devices.

As examples of information indicating a relationship between multiple terminal devices, there may be cited a relationship in which pairing has been established, a relationship in which tethering is allowed, or other such relationship pertaining to authentication between multiple terminal devices. As yet other examples, there may be cited relationships pertaining to locational relations among multiple terminal devices, such as how near multiple terminal devices are to one another, or whether multiple terminal devices next to one another are facing the same direction.

As an example of relationships between users who operate terminal devices, there may be cited relationships that pertain to authentication between multiple users, such as a relationship in which another user is allowed to join an application being run on the terminal device of an individual's terminal device, a relationship in which user information (user ID, SNS information, contact list information) or content stored on an individual's terminal device is allowed to be transferred to another terminal device and shared by another user, or a relationship in which a friend request received from another user in a SNS application or the like is granted.

A swipe operation refers to an operation in which a pointer, such as the user's finger, contacts the touch panel, and is slid in one direction while maintaining a state of contact for a given time interval, followed by release of the pointer. The swipe operation in question is used merely for purposes of distinguishing the operation from a simple tap operation or double tap operation, and there are no limitations in terms of specifying a speed, distance, or angle of sliding. That is, a so-called drag operation, flick operation, or the like could be considered to be a swipe operation.

The interval of time may be any one that directly or indirectly indicates an interval of time between the first swipe operation and the second swipe operation taking place. As an example, there may be cited an interval of time that is specified on the basis of first operation information corresponding to the first swipe operation, and second operation information corresponding to the second swipe operation. More specifically, there may be cited an interval from reception of the first operation information to reception of the second operation information, an interval between the time that the first swipe operation included in the first operation information took place, and the time that the second swipe operation included in the second operation information took place, or the like.

Examples such as the following may be cited as application examples of the several embodiments of the present invention. As shall be apparent, the present invention is not limited to the following example. A user is running a game application on a personal terminal device, while another user adjacent to the first user is running the same game application on a different terminal device. At this time, one of the users invites the other user to join the currently running session of the game application. In this case, the terminal devices operated by the two users are lined up next to each other (see FIG. 4), and when one of the users performs a continuous swipe operation across the two terminal devices, the other user will be allowed to join the session.

<First Embodiment of the Present Invention>

[Overview]

In a system 1A according to a first embodiment of the present invention, a server device generates prescribed relationship information. Specifically, in the event that the server device receives from one terminal device information that a swipe operation was performed, and also receives from another terminal device information that a swipe operation was performed, the server devices determines whether the interval of time of the two swipe operations falls within a prescribed range. The server device then generates prescribed relationship information on the basis of the determination result, and presents the information in question to each of the terminal devices.

[System 1A According to the Present Embodiment]

FIG. 1 is a diagram showing the configuration of the system 1A according to the first embodiment of the present invention. As indicated in FIG. 1, the system 1A includes a server device 100 capable of running a program for a process to generate the relationship information according to the present embodiment; a terminal device 200-1; and a terminal device 200-2, the devices being connected via a network 300 so that communication among them is possible. Via this communication, information of various kinds, data, programs, and the like are exchanged between the server device 100 and the terminal device 200-1 or the terminal device 200-2, or between the terminal device 200-1 and the terminal device 200-2.

Communication between the server device 100, the terminal device 200-1, and the terminal device 200-2 may utilize either wired communication or wireless communication, or both communication formats, as desired. As examples of wireless communication, there may be cited mobile wireless communication as typified by the wideband-code division multiple access (W-CDMA) format, near-distance wireless communication such as Bluetooth™, a wireless LAN as typified by IEEE 802.11, and the like.

[Server Device 100]

Figure 2:
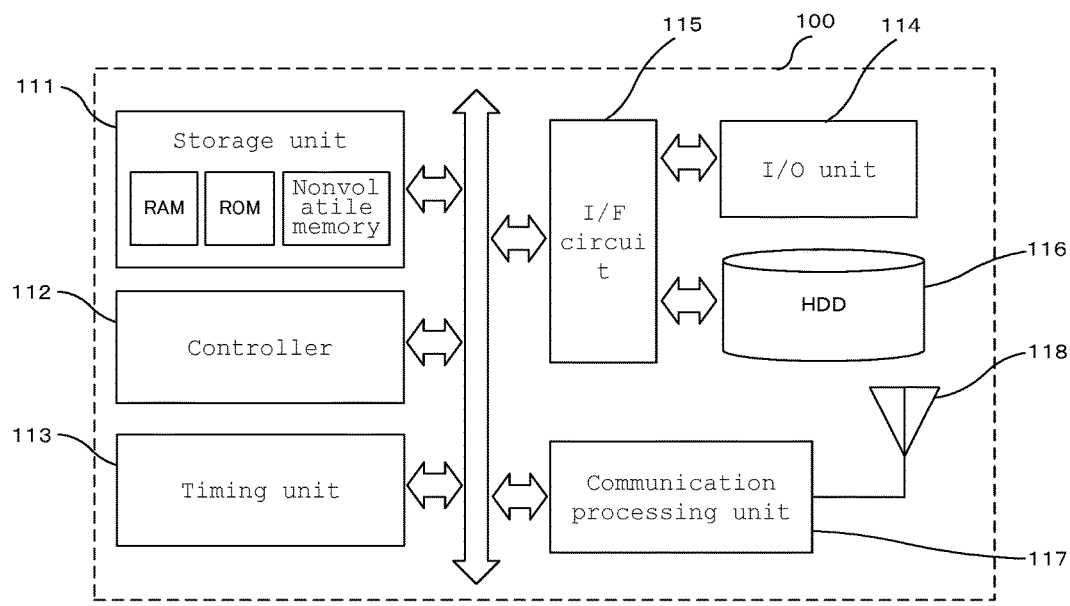
FIG. 2 is a block diagram showing an example of the configuration of a server device 100 according to the first embodiment of the present invention.

FIG. 2 is a block diagram showing an example of the configuration of the server device 100 according to the first embodiment of the present invention. It is not necessary for the server device 100 to be provided with all of the constituent elements shown in FIG. 2, and configurations in which some of these are omitted are possible as well; it is also possible to add other constituent elements.

As indicated in FIG. 2, the server device 100 includes a storage unit 111 that includes a RAM, a ROM, a non-volatile memory, and the like; a controller 112; a timing unit 113; an I/F circuit 115 connected to an I/O unit 114 and HDD 116; and a communication unit composed of a communication processing unit 117 and an antenna 118. These constituent elements are electrically connected to one another via control lines and data lines.

As mentioned above, the storage unit 111 includes a RAM, a ROM, a non-volatile memory, and the like. The storage unit 111 stores a program for a process to generate relationship information, carried out in the server device 100; a system capable of running the program, and the like. Such programs and systems are loaded and run by the controller 112. The storage unit (in particular, the RAM) is used on a temporary basis, for executing data write and read operations while the program is being executed by the controller 112.

The controller 112 is composed of a CPU (microcomputer), and controls the other connected constituent elements, on the basis of various programs stored in the storage unit 111. The controller 112, for example, reads out, on an as-needed basis, a program stored in the storage unit 111, for executing a process to generate relationship information or the like, and controls the execution of the program; and additionally controls the communication unit in order to transmit and receive information of various kinds to and from a plurality of terminal devices, including the terminal device 200-1 and the terminal device 200-2. The controller 112 also controls the storage unit 111 and the HDD 116 to carry out read operations or update processes on user information or the like stored in the storage unit 111 or the HDD 116. Additionally, on the basis of operation information received from the terminal devices, the controller 112, together with the timing unit 113, calculates intervals of time between swipe operations carried out on the terminal devices. The controller 112 also executes processes on the basis of position coordinates at which swipe operations are carried out on the terminal devices. In addition, the controller 112 generates prescribed relationship information on the basis of the calculated intervals or time and position coordinates.

The timing unit 113 detects the current time, the time at which operation information was received from each of the terminal devices, and the like. The timing unit 113, in cooperation with controller 12, also receives first operation information from the terminal device 200-1, starts a timer, and measures the interval of time until second operation information is received from the terminal device 200-2.

The HDD 116 exchanges information of various kinds with other constituent elements via the I/F circuit 115. The HDD 116 stores user information, terminal device information, object information for characters and the like, programs, and the like, which are necessary for applications running on the terminal devices, the information being read out on an as-needed basis in response to commands from the controller 112.

The communication processing unit 117 performs processes such as modulation and demodulation of information, so that information may be transmitted to and received from the terminal devices, or other server devices (not illustrated), via the antenna 118.

In this communication processing unit 117, processing based on a wideband wireless communication format as typified by the wideband-code division multiple access (W-CDMA) format, or processing based on a narrow-band wireless communication format such as Bluetooth™ or a wireless LAN as typified by IEEE 802.11, is carried out. The communication processing unit 117 is connected to the antenna 118, making possible wireless communication with the outside; however, wireless communication is not absolutely necessary, and communication with the outside via a wired cable connection is also possible. In some instances, the communication processing unit 117 forms a communication unit together with the antenna 118.

[Terminal Device 200]

Figure 3:
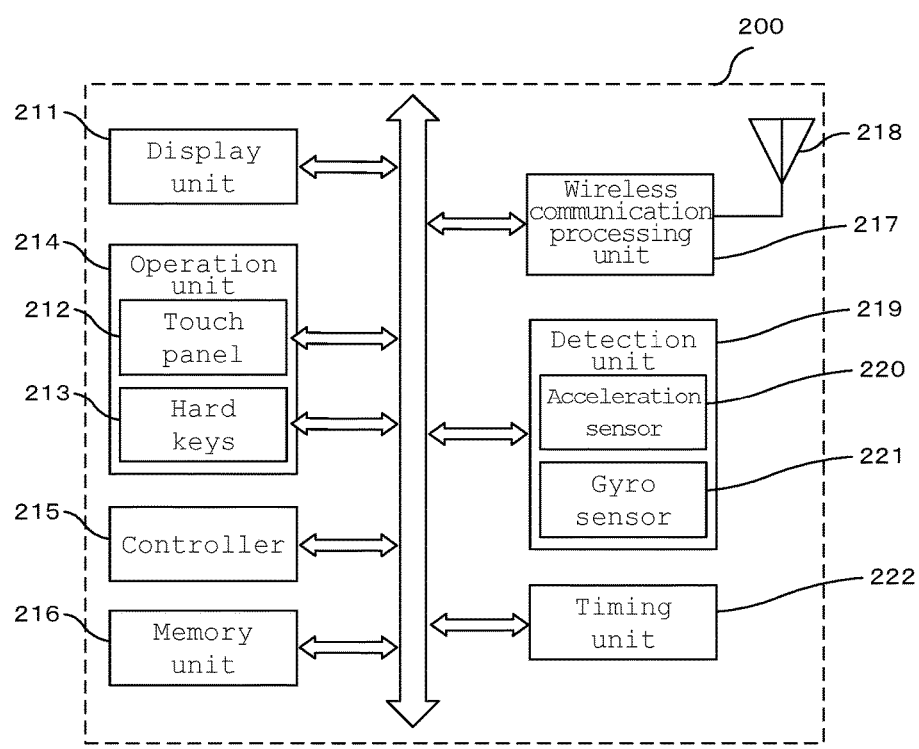
FIG. 3 is a block diagram showing an example of the configuration of a terminal device 200 according to the first embodiment of the present invention.

FIG. 3 is a block diagram showing an example of the configuration of the terminal device 200 according to the present embodiment. It is not necessary for the terminal device 200 to be provided with all of the constituent elements shown in FIG. 3, and configurations in which some of these are omitted are possible as well; it is also possible to add other constituent elements.

The terminal device 200 functions as a first terminal device 200-1 (first terminal device) having a touch panel that is operable by a first user, or as a second terminal device 200-2 (second terminal device) having a touch panel that is operable by a second user. Examples of the terminal device 200 include, in addition to smartphones and other such mobile terminal devices capable of wireless communication, mobile gaming devices, feature phones, mobile information terminals, PDAs, laptop computers, and the like, it being possible to implement the present invention in any portable device. Utilization as the terminal device 200 is possible even in terminal devices that are not conveniently portable, such as desktop computers. It is not absolutely necessary that the terminal device 200-1 and the terminal device 200-2 be terminal devices of the same type.

As indicated in FIG. 3, the terminal device 200 includes a display unit 211; an operation unit 214 composed of a touch panel 212 and hard keys 213; a controller 215; a memory unit 216; a communication unit composed of a wireless communication processing unit 217 and an antenna 218; a detection unit 219 composed of an acceleration sensor 220 and a gyro sensor 221; and a timing unit 222. These constituent elements are electrically connected to one another via control lines and data lines.

In response to commands from the controller 215, the display unit 211 reads out image information stored in the memory unit 216, and produces various types of display. The display unit 211 is composed, e.g., of a liquid crystal display.

The operation unit 214 is composed of the touch panel 212, the hard keys 213, and the like, and receives input of various commands from the user. The touch panel 212 is arranged so as to cover the display unit 211, and outputs to the controller 215 position coordinate information that corresponds to image data displayed by the display unit 211. As the touch panel format, there can be utilized any of known formats such as the resistive touch format, the electrostatic capacitive coupling format, or the ultrasonic surface acoustic wave format. Depending on the format utilized, contact of the touch panel by a pointer of known type, such as a finger or stylus pen, is detected. In the present embodiment, the touch panel 212 detects a swipe operation by a pointer.

The controller 215 is composed of a CPU (microcomputer), and controls the other connected constituent elements, on the basis of various programs stored in the storage unit 216. Specifically, the controller 215 reads out from the memory unit 216 and executes a program for running a prescribed application, or a program necessary for a process to generate relationship information. The controller 215 also generates operation information relating to a swipe operation, on the basis of the output of the touch panel 212. The controller 215 moreover controls the timing unit 222, and generates information relating to the time of a swipe operation. The controller 215 may be composed of a single CPU, or composed of multiple CPUs. A separate CPU specialized for image processing may also be provided.

The memory unit 216 includes a ROM, a RAM, a non-volatile memory, and the like. The ROM stores programs for running prescribed applications, and a program necessary for a process to generate relationship information. The RAM is a memory used for data write and read operations that take place while various commands generated by execution of a program stored in the ROM are being processed by the controller 215. The non-volatile memory is memory for executing data write and read operations through execution of the program in question, the written data being held even after execution of the program in question has terminated.

The wireless communication processing unit 217 performs processes such as modulation and demodulation in order for information to be transmitted to and received from the remote server device 100 or other terminal devices, via the connected antenna 218. For example, the wireless communication processing unit 217 may carry out a process for receiving from the server device 100 a program for running a prescribed application, or user information to be utilized in the application in question, in accordance with advance of the application according to the present embodiment. The unit also carries out a process for transmitting to the server device the result of running an application.

In this wireless communication processing unit 217, processing takes place on the basis of a wideband wireless communication format as typified by the wideband-code division multiple access (W-CDMA) format; however, it would also be possible to carry out processing on the basis of a format relating to narrow-band wireless communication, such as Bluetooth™ or a wireless LAN as typified by IEEE 802.11.

The wireless communication processing unit 217 and the antenna 218 together constitute a communication unit. It is possible to employ wired communication in place of, or in addition to, wireless communication. In this case, a communication processing unit for wired communication would be provided in place or, or in addition to, the wireless communication processing unit 217.

The timing unit 222 detects the current time, the time at which operation information was received from other terminal devices, the time at which a swipe operation was carried out on the host touch panel 212, and the like. The timing unit 222, in cooperation with controller 215, detects a swipe operation on the host terminal device, starts a timer, and measures the interval of time until operation information is received from another terminal device 200.

[Swipe Operations on the Terminal Device 200-1 and the Terminal Device 200-2]

Figure 4:
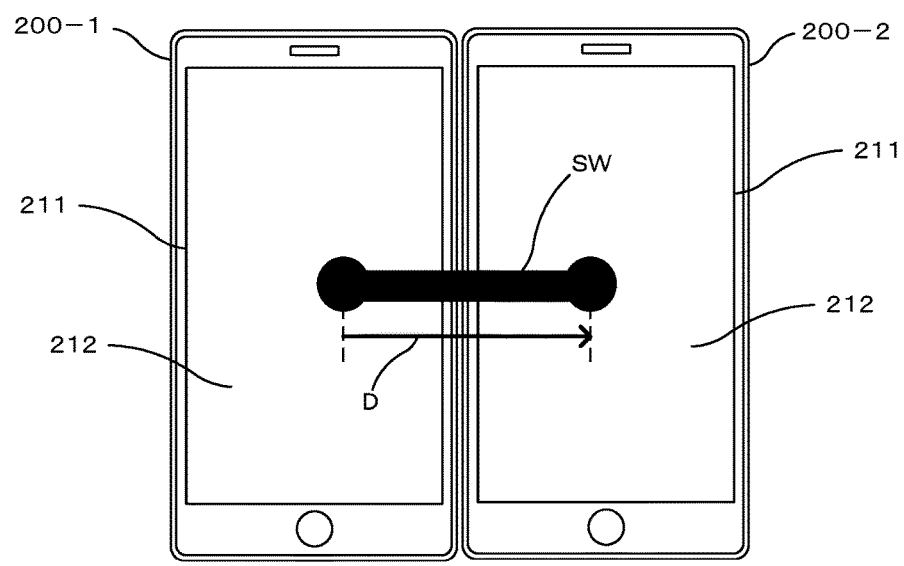
FIG. 4 is a conceptual diagram showing an example of a swipe operation according to the first embodiment of the present invention.

FIG. 4 is a conceptual diagram showing an example of a swipe operation SW according to the first embodiment of the present invention. The following scenario shall be described here. The user of the terminal device 200-1 (the first user) is running a game application on the terminal device 200-1, and another user (the second user) is running the same game application on the terminal device 200-2. The game application is composed of multiple sessions. After clearing a task presented in each session, it is possible to advance to the next session. With this game application, it is possible for the users of the terminal device 200-1 and the terminal device 200-2 to respectively advance through sessions in independently or in tandem. In the case of advancing in tandem, the first user invites the second user to join a session of a game application through which the first user is advancing. At this time, terminal devices belonging to the two users are lined up next to each other, and when the first user performs a continuous swipe operation across the two terminal devices by an unbroken gesture, the second user is allowed to join, so that the second user can join the session.

In FIG. 4, the terminal device 200-1 and the terminal device 200-2 are arranged adjacent to one another and facing in the same direction. The user of the terminal device 200-1 (the first user) then inputs a swipe operation SW in a direction D in continuous fashion by an unbroken gesture so as to cross over from the touch panel 212 of the terminal device 200-1 to the touch panel 212 of the terminal device 200-2. The second user is thereby allowed to join the session.

[Process Sequence]

Figure 5:
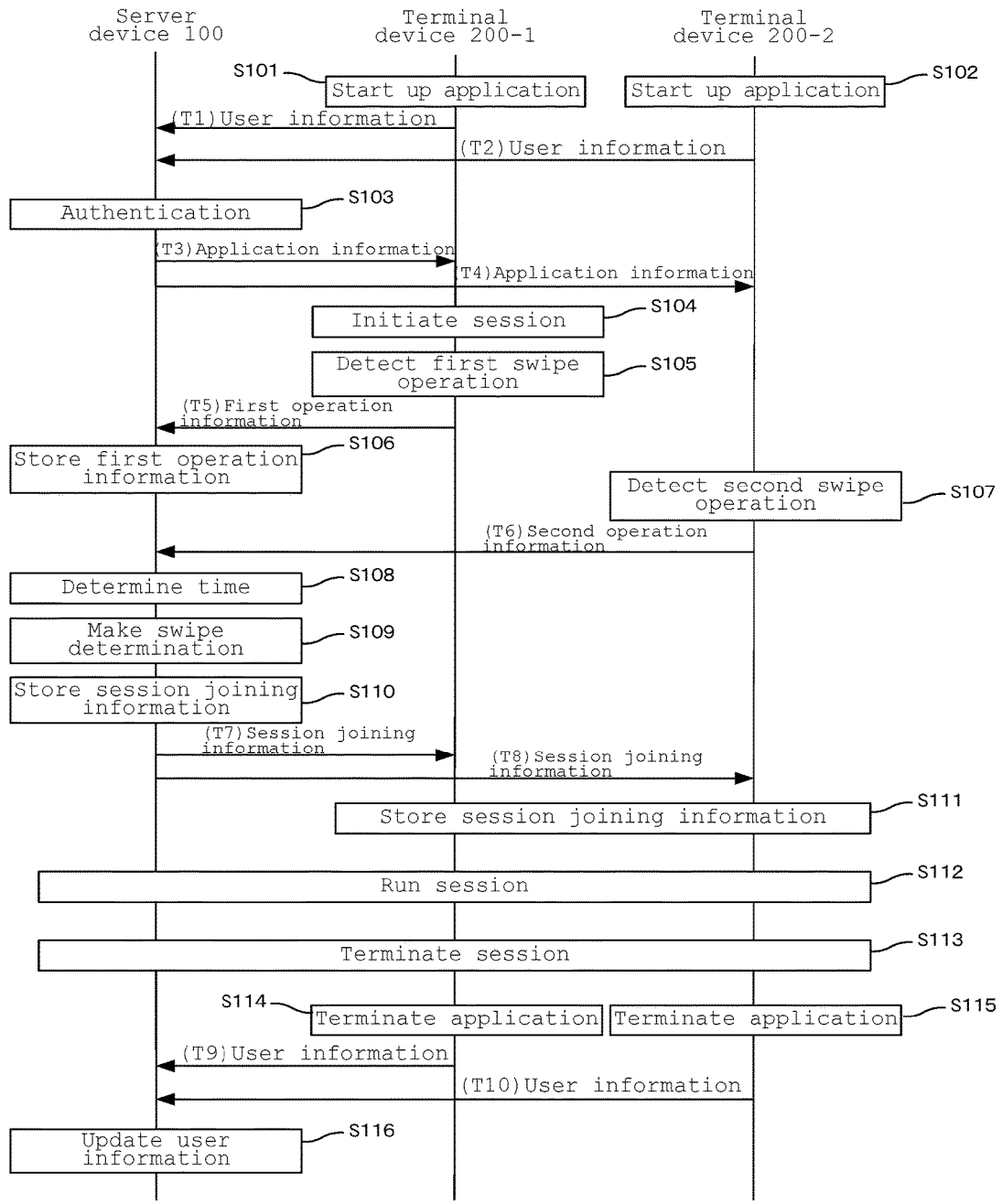
FIG. 5 is a diagram showing a process sequence in the server device 100, a terminal device 200-1, and a terminal device 200-2 according to the first embodiment of the present invention.

FIG. 5 is a diagram showing a process sequence carried out in the server device 100, the terminal device 200-1, and the terminal device 200-2 in the system 1A according to the first embodiment of the present invention. Here, a scenario in which the game application shown by way of example in FIG. 4 is being run on each terminal device will be described.

As indicated in FIG. 5, firstly, a prescribed game application is started up in the terminal device 200-1 operated by the first user, and the terminal device 200-2 operated by the second user (S101 and S102). Next, the terminal device 200-1 and the terminal device 200-2 respectively transmit user information (T1 and T2) to the server device 100.

Having received the user information (T1 and T2), on the basis of the user information in question, the server device 100 performs authentication as to whether the user is a legitimate user of the game application. In the event that the user is found to be legitimate, the program necessary to run the game application, and application information (T3 and T4) that includes game information for each user, are transmitted to the terminal device 200-1 and the terminal device 200-2.

In the terminal device 200-1, once a prescribed session has been initiated in association with advance of the application, a screen for verifying whether to invite the user of the other terminal to join is displayed (S104). In the event that an invitation to join is selected, a screen prompting a swipe operation on the touch screen 212 is displayed. When the touch screen 212 detects that a swipe operation (first swipe operation) has been performed on the touch screen 212 in question (S105), information indicating that this swipe operation took place (first operation information) is generated. This information may include the following information, in addition to the information indicating that the swipe operation was performed. For example, there may be cited information such as the time that the swipe operation took place, the direction of the swipe operation, the position coordinates at which contact of the pointer was last detected on the touch panel 212 of the terminal device 200-1, and the like. The terminal device 200-1 subsequently transmits the first operation information (T5) to the server device 100.

Once the first operation information has been received via the communication unit, the server device 100 stores the information in question in the storage unit 111 or the HDD 116 (S106), and starts the timer of timing unit 113. The device then stands by until second operation information transmitted by the terminal device 200-2 arrives, or until a prescribed time limit (e.g., 30 seconds) has passed.

When the touch panel 212 detects a swipe operation (second swipe operation) performed on the touch panel 212 in question (S107), the terminal device 200-2 generates information indicating that this swipe operation took place (second operation information). This information may include information such as the time that the swipe operation took place, the direction of the performed swipe operation, the position coordinates at which contact of the pointer was first detected on the touch panel 212 of the terminal device 200-2, and the like. The terminal device 200-2 subsequently transmits the second operation information (T6) to the server device 100.

Once the server device 100 receives the second operation information via the communication unit, it stores the information in question in the storage unit 111 or the HDD 116, and stops the timer of timing unit 113. In the event that the time limit (30 seconds) has passed without receiving the second operation information, the server device 100 terminates the invitation for the other user to join the session, and transitions to S112, so that the session advances in independent mode.

From the time measured by the timer of timing unit 113, the server device 100 detects the interval of time of the first swipe operation performed from the terminal device 200-1 and the second swipe operation performed from the terminal device 200-2. The server device 100 then determines whether the interval of time is within a prescribed time (e.g., 5 seconds) (S108).

Next, on the basis of information such as the direction of the swipe operation included in the first operation information and the second operation information, the server device 100 determines whether the first swipe operation and the second swipe operation were performed in a continuous manner (S109).

Then, in the event that, on the basis of the determinations in S108 and S109, it is decided that the first swipe operation and the second swipe operation were performed continuously through an unbroken gesture, information allowing the second user operating the terminal device 200-2 to join the session (session joining information) is generated, by way of relationship information. The server device 100 then stores the session joining information to the storage unit 111 or to the HDD 116 of the server device 100 (S110). The server device 100 also transmits the session joining information (T7 and T9) to each of the terminal devices.

The terminal device 200-1 and the terminal device 200-2 which have received the session joining information save the received session joining information as relationship information, to their own memory unit 216 within the terminal device (S111).

The server device 100, and the terminal device 200-1 and the terminal device 200-2, then cooperate with one another to advance through the session in tandem through operation of the terminal device 200-1 by the first user and operation of the terminal device 200-2 by the second user (S112). As an example, in a battle game against enemy characters taking place during a session, a character linked to the second user appears as a friendly character, forms a team with the first user's character, and the battle game advances.

Subsequently, the session advances, and once the players clear the session in question, the session terminates (S113). As an example, a session may terminate when the first user's character and the second user's character together conquer the enemy characters in the battle game taking place in the session in question. Alternatively, a session may terminate when both characters have no more lives, and are deemed to have been defeated by the enemy characters.

Once a session has terminated, the terminal device 200-1 and the terminal device 200-2 carry out a process to terminate the application which has been running on the respective terminal devices (S114). More specifically, each of the terminal devices transmits to the server device 100 user information (T9 and T10) that has been updated to reflect running of the game application.

Once the server device 100 has received the updated user information from the terminal devices, the user information in question is updated and registered in either the storage unit 111 or the HDD 116 (S116).

In the system 1A according to the present embodiment, when relationship information is generated by the server device 100, the first operation information and the second operation information transmitted from the terminal devices is utilized. Consequently, it is possible to reduce the burden of processing on the server device 100. Additionally, for the users operating the terminal devices, generation of relationship information is brought to completion through a single continuous swipe operation over the terminal device 200-1 and the terminal device 200-2 by the first user. Consequently, the burden for the users entailed in generating relationship information can be reduced.

[Process Flow of server Device 100]

Figure 6:
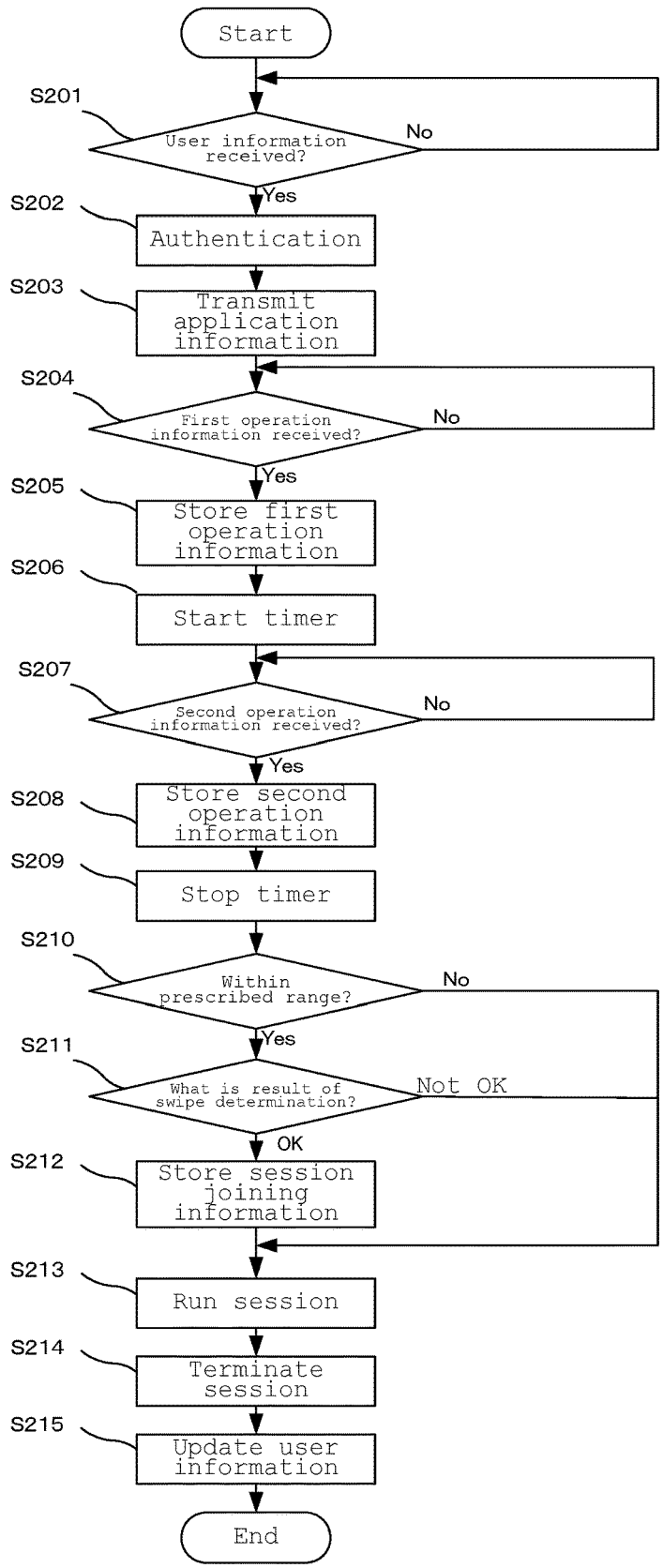
FIG. 6 is a diagram showing a process flow carried out in the server device 100 according to the first embodiment of the present invention.
Figure 7:
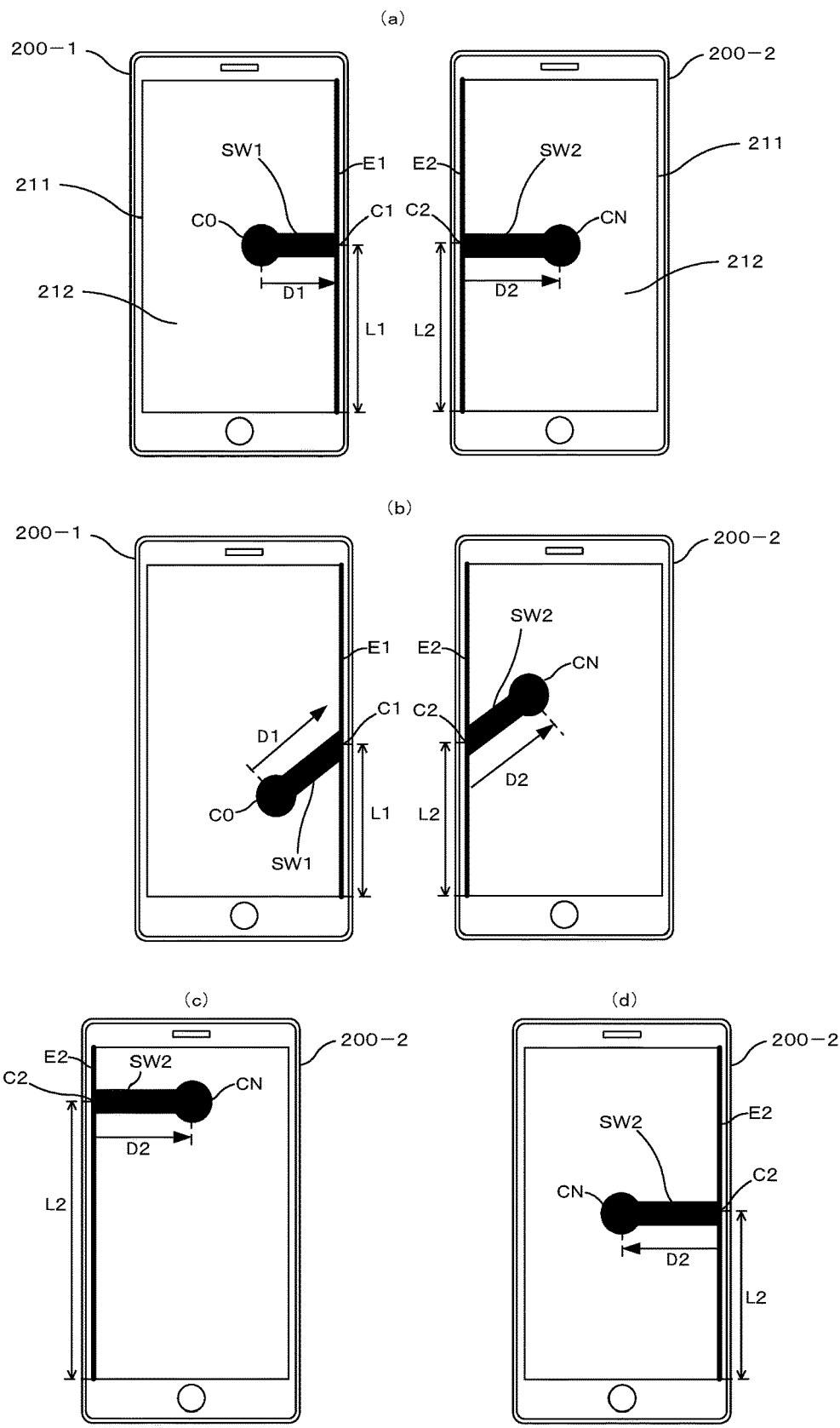
FIG. 7A includes conceptual diagrams showing an application example in the terminal device 200-1 and the terminal device 200-2 of the system 1A according to the first embodiment of the present invention.
FIG. 7B includes conceptual diagrams showing an application example in the terminal device 200-1 and the terminal device 200-2 of the system 1A according to the first embodiment of the present invention.
FIG. 7C includes conceptual diagrams showing an application example in the terminal device 200-1 and the terminal device 200-2 of the system 1A according to the first embodiment of the present invention.
FIG. 7D includes conceptual diagrams showing an application example in the terminal device 200-1 and the terminal device 200-2 of the system 1A according to the first embodiment of the present invention.

FIG. 6 is a diagram showing a process flow carried out in the server device 100, on the basis of a program for a relationship information generation process. As with FIG. 5, an instance of a process relating to a game application shall be described here.

The server device 100 stands by for user information to be transmitted to it from any communication-enable connected terminal device, in association with running of a game application on the device. When user information is received from one terminal device 200-1 among these (S201), on the basis of the received user information, the controller 112 of the server device 100 looks up the user information stored in the storage unit 111 or the HDD 116, and performs authentication as to whether the first user operating the terminal device 200-1 is a legitimate user of the game application in question (S202). When, as a result of the authentication, the user is found to be legitimate, the controller 112 of the server device 100 transmits a program for running the game application, and user information of various kinds, to the terminal device 200-1 via the communication unit (S203).

Subsequent to S203 as well, the aforementioned program will continue to transmit on an as-needed basis in response to advance of the game application, though this is not expressly illustrated. Relationship information to other terminal devices or users can be stored in addition to game application advance information, acquired item information, and the like which has been associated with information that identifies individual terminal devices, or associated with individual user information, as the user information which is stored in the storage unit 111 or the HDD 116.

A prescribed session is then initiated on the terminal device 200-1, and an invitation screen to join the session is displayed. Then, a swipe operation by the first user (first swipe operation) prompts the terminal device 200-1 to transmit to the server device 100 first operation information that includes information indicating that the first swipe operation took place, information relating to the direction of the first swipe operation, and information relating to the position coordinates at which contact of the pointer was last detected on the touch panel 212 of the terminal device 200-1. The server device 100 stands by to receive the first operation data, before performing the relationship information generation process.

Upon receipt of the first operation information from the terminal device 200-1 (S204), the controller 112 of the server device stores the received information to the storage unit 111 or the HDD 116 (S205). Thereafter, on the basis of receipt of the first operation information, the controller 112 of the server device 100 performs control to start the timer provided to the timing unit 113, and initiates measurement of time, beginning from receipt of the first operation information (S206). The server device 100 then stands by to receive from the terminal device 200-2 second operation information that includes at least information indicating that a swipe operation (second swipe operation) took place, information relating to the direction of the second swipe operation, and information relating to the position coordinates at which contact of the pointer was first detected on the touch panel 212 of the terminal device 200-2.

In the present embodiment, a prescribed time limit for the standby time may be provided, though this is not expressly illustrated. For example, in the event that 30 seconds has passed since timer measurement was initiated, it is highly likely that there is no other user who will join the session, and therefore standby is terminated. The terminal device 200-1 then runs the session in independent mode (S213).

When the second operation information is received within the time limit (S207), the controller 112 of the server device 100 stores the second operation information in question to the storage unit 111 or the HDD 116 (S208), and on the basis of the received second operation information stops the timer of the timing unit 113 (S209).

On the basis of the time measured by the timing unit 113, i.e., the interval of time from receipt of the first operation information to receipt of the second operation information, the controller 112 of the server device 100 determines whether the interval of time in question is within a prescribed time (e.g., 5 seconds) (S210). In the event that the result of the determination is that the interval is within the prescribed range, it is decided to be highly likely that the first swipe operation and the second swipe operation were carried out through a continuous unbroken operation by the same user. On the other hand, when the result of the determination is that the interval is not within the prescribed range, the system transitions to run the session in independent mode (S213).

The controller 112 of the server device 100 compares the information relating to the direction of the first swipe operation, the information relating to the position coordinates at which contact of the pointer was last detected on the touch panel 212 of the terminal device 200-1, the information relating to the direction of the second swipe operation, and the information relating to the position coordinates at which contact of the pointer was first detected on the touch panel 212 of the terminal device 200-2, which information is included in the first operation information and the second operation information received from the terminal devices; and determines whether the first swipe operation and the second swipe operation were carried out through a continuous unbroken operation by the same user (S211).

When, as a result of the determination, it is decided to be highly likely that the first swipe operation and the second swipe operation were carried out through a continuous unbroken operation by the same user, the second user operating the terminal device 200-2 is allowed to join the session, and the system transitions to a process for storing this permission. Specifically, the controller 112 of the server device 100 generates information allowing the second user to join the session (session joining information) (S212). The controller 112 of the server device 100 then updates the information stored in the storage unit 111 or the HDD 116, on the basis of the session joining information. The server device 100 also transmits the session joining information to the terminal devices via the communication unit.

On the other hand, when as a result of the determination it is decided that the first swipe operation and the second swipe operation are not continuous, the system transitions to execute the session in independent mode on the terminal device 200-1, and does not allow others to join the session that is being advanced on the terminal device 200-1 (S213). At this time, information to the effect that others are not allowed to join the session of the terminal device 200-2 is generated by way of relationship information, and the information stored in the storage unit 111 or HDD 116 is updated. The server device 100 transmits the information in question to the terminal device 200-1 and the terminal device 200-2 via the communication unit.

Next, the server device 100 transmits information, such as a program relating to a game application, on an as-needed basis to the terminal devices, so that the first user and the second user advance through the session in multiple-player mode (S213). The server device 100 then receives from the terminal devices a notification to the effect that the session has terminated and that the game application has terminated. Thereafter, on the basis of user information received together with the notification in question, the controller 112 of the server device 100 performs control to update the user information stored in the storage unit 111 or HDD 116. The process sequence then terminates.

In the server device 100 according to the present embodiment, only the first operation information and the second operation information transmitted from the terminal device 200-1 and the terminal device 200-2 are utilized to generate relationship information. Consequently, it is possible to reduce the processing burden on the server device 100.

[Example of Determination Process by Swipe Operation]

FIG. 7A-D are conceptual diagrams showing an application example in the terminal device 200-1 and the terminal device 200-2 of the system 1A according to the first embodiment of the present invention. More specifically, FIG. 7A-D contains drawings that show an example of the process for determining whether a swipe operation on the terminal device 200-1 and the terminal device 200-2 was carried out by a continuous unbroken operation by the same user (S211 of FIG. 6).

FIG. 7A shows an example of a case in which information allowing the second user operating the terminal device 200-2 to join a session advancing on the terminal device 200-1 operated by the first user is generated as relationship information.

As indicated in FIG. 7A, a swipe operation SW1 (first swipe operation) resulting from an unbroken swipe operation by the first user on the terminal device 200-1 is detected. More specifically, the touch panel 212 of the terminal device 200-1 detects the position coordinates C0 of first contact by the pointer of the first user who is holding the terminal device 200-1, the position coordinates of contact by the pointer which during the swipe operation SW1 have been detected within a prescribed period in association with movement of the contact position due to the swipe operation SW1, and the position coordinates C1 at which contact of the pointer was last detected on the touch panel 212 of the terminal device 200-1. The touch panel 212 then notifies the controller 215 of these position coordinates.

Having received from the touch panel 212 position coordinates that include at least the position coordinates C0 and the position coordinates C1, the controller 215 determines from the position coordinates in question that the swipe operation SW1 took place on the touch panel 212 of the terminal device 200-1. From the received position coordinates C0 and position coordinates C1, the controller 215 also calculates the direction D1 in which the swipe operation SW1 was performed.

The controller 215 of the terminal device 200-1 generates first operation information that includes information indicating that the swipe operation SW1 took place, information relating to the direction D1 in which the swipe operation SW1 was performed, and information relating to the position coordinates C1. The controller 215 of the terminal device 200-1 then stores the generated first operation information in the memory unit 216, and transmits the information to the server device 100.

When the swipe operation SW1 produced by an unbroken swipe operation by the first user is followed by input of a second swipe operation SW2 on the touch panel 212 of the terminal device 200-2, the touch panel 212 of the terminal device 200-2 detects the position coordinates C2 of first contact by the pointer during the swipe operation SW2, the position coordinates of contact by the pointer which have been detected within a prescribed period in association with movement of the contact position due to the swipe operation SW2, and the position coordinates CN at which contact of the pointer was last detected by the touch panel 212 of the terminal device 200-2. The touch panel 212 then notifies the controller 215 of the terminal device 200-2 of these position coordinates.

Having received from the touch panel 212 position coordinates that include at least the position coordinates C2 and the position coordinates CN, the controller 215 of the terminal device 200-2 determines from the position coordinates in question that the swipe operation SW2 has taken place on the touch panel 212 of the terminal device 200-2. From the received position coordinates C2 and position coordinates CN, the controller 215 also calculates the direction D2 in which the swipe operation SW2 was performed.

The controller 215 of the terminal device 200-2 generates second operation information that includes information indicating that the swipe operation SW2 took place, information relating to the direction D2 in which the swipe operation SW2 was performed, and information relating to the position coordinates C2. The controller 215 of the terminal device 200-2 then stores the generated second operation information in the memory unit 216, and transmits the information to the server device 100.

Next, the controller 112 of the server device 100 compares the received first operation information and second operation information. Specifically, the controller 112 first compares the direction D1 in which the swipe operation SW1 was performed and the direction D2 in which the swipe operation SW2 was performed, and determines whether the difference between the angles indicated by both directions is within a prescribed range.

Normally, a swipe operation is performed in a substantially unchanging direction from start to finish. Therefore, in cases in which the direction D1 of the swipe operation SW1 and the direction D2 of the swipe operation SW2 substantially coincide, it will be decided that it is highly likely that the same user input a continuous unbroken motion straddling the touch panel 212 of the terminal device 200-1 and the touch panel 212 of the terminal device 200-2, as shown by example in FIG. 4. In cases in which such a decision has been made, the controller 112 determines that the first user intended to allow the second user operating the second terminal device 200-2 to join the session.

The controller 112 of the server device 100 compares the information relating to the position coordinates C1 at which contact of the pointer was last detected by the touch panel 212 of the terminal device 200-1, and the position coordinates C2 at which contact of the pointer was first detected by the touch panel 212 of the terminal device 200-2. Specifically, a calculation is made of the side E1 over which the swipe operation SW1 passed while moving across the touch panel 212 of the terminal device 200-1 from the position coordinates C1, as well as the height L1 of passage across this side E1, and the side E2 over which the swipe operation SW2 passed while moving across the touch panel 212 of the terminal device 200-2 from the position coordinates C2, as well as the height L2 of passage across this side E2, and a comparison is made of the results of the calculations.

As one example in the present embodiment, in a case in which the first user intends to allow the second user to join the session, the terminal device 200-1 and the terminal device 200-2 will be arranged next to one another and facing in the same direction beforehand. In this state, when the first user performs an unbroken swipe operation, the height L1, which is computed from the position coordinates last detected on the terminal device 200-1, and the height L2, which is computed from the position coordinates C2 first detected on the terminal device 200-2, will be substantially the same height. Consequently, in cases in which the difference between heights L1 and L2 is within a prescribed range, it will be decided that the first user intends to allow the second user operating the terminal device 200-2 to join the session.

Like FIG. 7A, FIG. 7B shows an example of a case in which information allowing the second user operating the terminal device 200-2 to join a session advancing on the terminal device 200-1 held by the first user is generated as relationship information. FIG. 7A shows the swipe operation SW1 and the swipe operation SW2 being performed in a substantially horizontal direction. However, it is possible for the relationship information generation process to be performed even when the swipe operation SW1 and the swipe operation SW2 have been performed in a diagonal direction as shown in FIG. 7B.

FIG. 7C and FIG. 7D show examples of cases of generation of information that will not allow the second user operating the terminal device 200-2 to join a session advancing on the terminal device 200-1 held by the first user. Detection of the swipe operation SW1 on the terminal device 200-1 takes place in the same manner as in the case of FIG. 7A.

First, in FIG. 7C, the direction D2 of the swipe operation SW2 coincides with the direction D1 of the swipe operation SW1. However, the height L2 at which the swipe operation SW2 passes over the edge E2 differs from the height L1 at which the swipe operation SW1 passes over the edge E1. That is, the difference between the height L1 and the height L2 is not within a prescribed range. In such cases, it will be decided that the first user does not intend to allow the second user to join the session.

In FIG. 7D, the height L2 at which the swipe operation SW2 has passed over the edge E2 substantially coincides with the height L1 at which the swipe operation SW1 has passed over the edge E1. However, the difference between the angle formed by the direction D2 of the swipe operation SW2 and the angle formed by the direction D1 of the swipe operation SW1 is not within a prescribed range, and the two directions do not coincide. Consequently, in such cases, it will be decided that the first user does not intend to allow the second user to join the session.

As indicated above, information relating to the direction in which a swipe operation was performed, and information relating to the position coordinates at which the swipe operation was performed, are utilized as operation information corresponding to the swipe operation. Consequently, when making a determination, a determination is made utilizing the aforementioned information, in addition to a determination based on an interval of time in order to generate relationship information, and it is therefore possible to identify relationships with higher accuracy.

<Second Embodiment of the Present Invention>

In the present embodiment, as in the first embodiment, the server device 100 executes a relationship information generation process. Whereas the first embodiment describes an example of generation of relationship information indicating a relationship between the terminal device 200-1 and the terminal device 200-2, or between the first user operating the terminal device 200-1 and the second user operating the terminal device 200-2, the present embodiment describes an example in which relationship information to a terminal device 200-3 and to a third user operating the terminal device 200-3, in addition to the preceding terminal devices, is generated. In the present embodiment, except for the above feature, the configuration, processes, and procedures are the same as in the first embodiment. Accordingly, a detailed description of these matters shall be dispensed with.

[System 1B According to the Present Embodiment]

Figure 8:
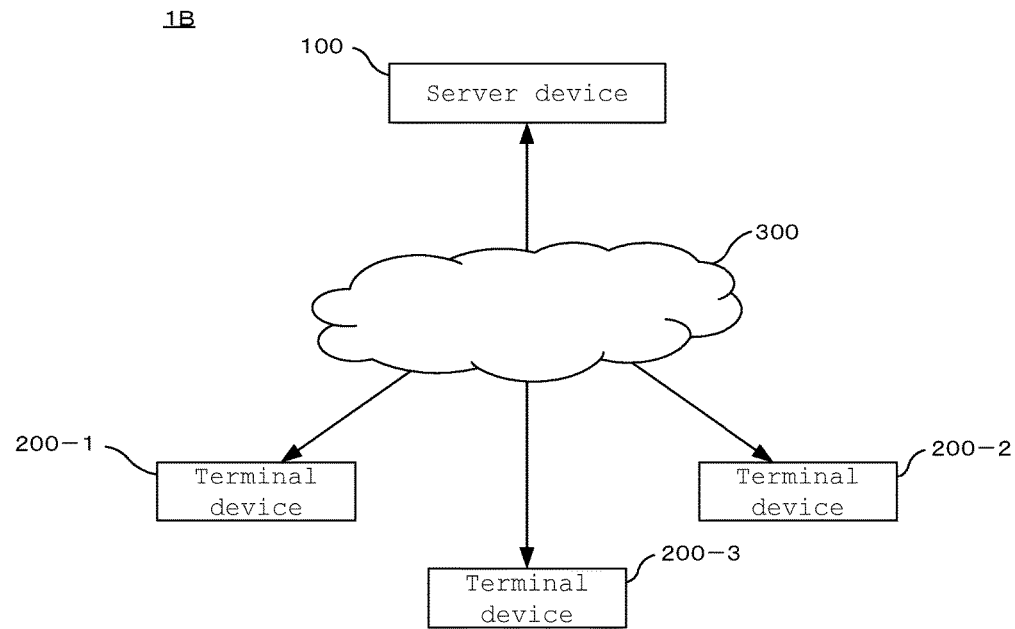
FIG. 8 is a diagram showing the configuration of a system 1B according to a second embodiment of the present invention.

FIG. 8 is a diagram showing the configuration of a system 1B according to a second embodiment of the present invention. In FIG. 8, in the system 1B according to the present embodiment, the terminal device 200-1, the terminal device 200-2, and the terminal device 200-3 are connected in communication-enabled fashion to the server device 100. The server device 100 generates relationship information among the aforementioned three terminal devices, or the first to third users who operate the terminal devices.

[Swipe Operations on Terminal Device 200-1, Terminal Device 200-2, and Terminal Device 200-3]

Figure 9:
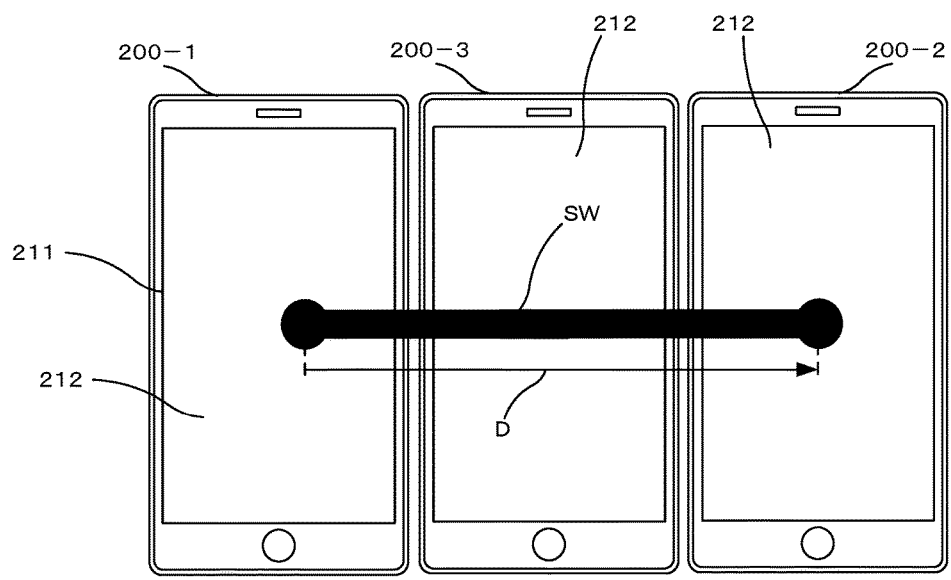
FIG. 9 is a conceptual diagram showing an example of a swipe operation according the second embodiment of the present invention.

FIG. 9 is a conceptual diagram showing an example of a swipe operation according the second embodiment of the present invention. Here, an example of a game application like that of the first embodiment is described as an example of performing the swipe operation SW in question.

As indicated in FIG. 9, the present embodiment differs from the first embodiment in that the third terminal device 200-3 has been arranged between the terminal device 200-1 and the terminal device 200-2. Specifically, the first user of the terminal device 200-1 is running a game application on the terminal device 200-1, while the same game application is being run on the terminal device 200-2 and the terminal device 200-3 as well. In the case in which the first to third users are advancing in tandem through a session of the game application in question, the first user invites the other users to join the session of the game application through which the first user is currently advancing. At this time, when the terminal device 200-1, the terminal device 200-3 and the terminal device 200-2 which are owned by the users are respectively lined up next to one another in that order, and the first user performs a swipe operation by an unbroken gesture so as to straddle all three of the terminal devices, it is decided that the terminal device 200-2 and the terminal device 200-3 are allowed to join, and the users who own the terminal devices can join the session.

[Process of Determination by Swipe Operation]

Figure 10:
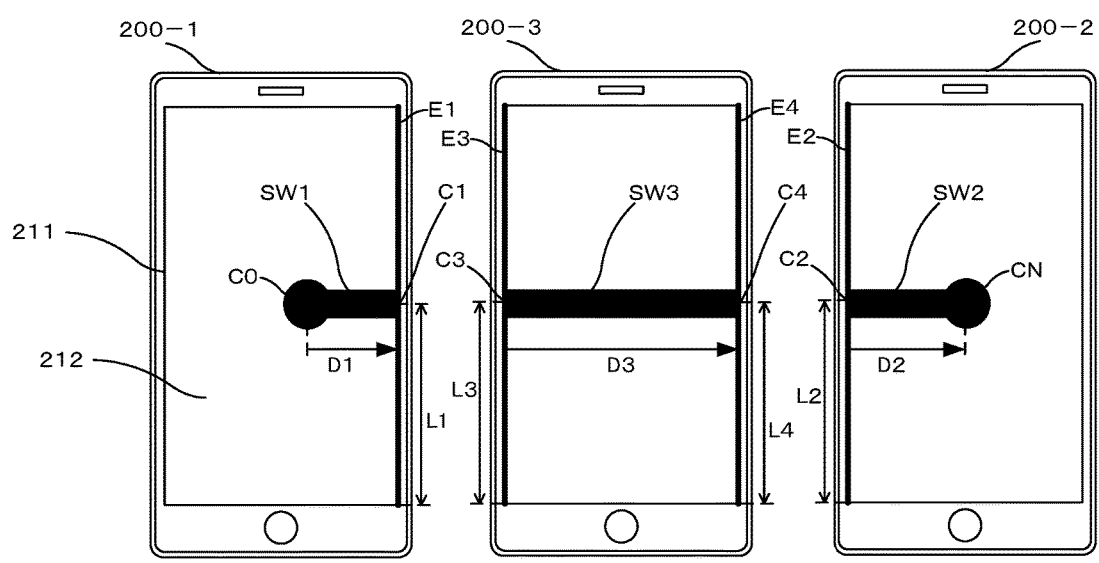
FIG. 10 is a conceptual diagram showing an application example in terminal devices 200 of the system 1B according to the second embodiment of the present invention.

FIG. 10 is a conceptual diagram showing an application example in the terminal devices 200 of the system 1B according to the second embodiment of the present invention. In this application example, the first user continuously inputs as an unbroken gesture a swipe operation SW1, a swipe operation SW3, and a swipe operation SW2, in the stated order as shown in FIG. 9. First, when the first user initiates the swipe operation on the touch panel 212 of the terminal device 200-1, through the same gesture and procedure as in the first embodiment, the terminal device 200-1 generates first operation information that includes information indicating that the swipe operation SW1 took place, information relating to the direction D1 in which the swipe operation SW1 was performed, and information relating to the position coordinates C1 at which contact of the pointer was last detected on the touch panel 212 of the terminal device 200-1, and transmits the information in question to the server device 100.

When, through an unbroken swipe operation by the first user, the swipe operation SW1 on the terminal device 200-1 is followed by input of the swipe operation SW3 on the touch panel 212 of the terminal device 200-3, the touch panel 212 of the terminal device 200-3 detects the position coordinates C3 of first contact during the swipe operation SW3, the position coordinates of contact by the pointer which have been detected within a prescribed period in association with movement of the contact position due to the swipe operation SW3, and the position coordinates C4 at which contact of the pointer was last detected on the touch panel 212 of the terminal device 200-3. The touch panel 212 then notifies the controller 215 of the terminal device 200-3 of these position coordinates.

From the position coordinates of which it has been notified, the controller 215 of the terminal device 200-3 determines that the swipe operation SW3 took place on the touch panel 212 of the terminal device 200-3. From the received position coordinates C3 and position coordinates C4, the controller 215 also calculates the direction D3 in which the swipe operation SW3 in question was performed.

The controller 215 of the terminal device 200-3 generates third operation information that includes information indicating that the swipe operation SW3 took place, information relating to the direction D3 in which the swipe operation SW3 was performed, information relating to the position coordinates C3, and information relating to the position coordinates C4. The controller 215 of the terminal device 200-3 then transmits the information in question to the server device 100.

When in the course of an unbroken swipe operation by the first user, the swipe operation SW3 on the terminal device 200-3 is followed by input of the swipe operation SW2 on the touch panel 212 of the terminal device 200-2, through the same gesture and procedure as in the first embodiment, the terminal device 200-2 generates second operation information that includes information indicating that the swipe operation SW2 took place, information relating to the direction D2 in which the swipe operation SW2 was performed, and information relating to the position coordinates C2, and transmits the information in question to the server device 100.

Next, when the server device 100 receives the first operation information, the second operation information, and the third information from the terminal devices, the controller 112 performs a process on the basis of this information.

Specifically, first, at timing coincident with receipt of the first operation information, the controller 112 starts the timer of the timing unit 113, and measures the intervals of time until receipt of the third operation information and the second operation information, respectively. Then, on the basis of the measured intervals of time, the controller 112 identifies the order in which the swipe operation SW1, the swipe operation SW3, and the swipe operation SW2 were performed, as well as determining whether the intervals of time fall within prescribed ranges. In the event that, as a result, the intervals have been determined to fall within the prescribed ranges, the controller 112 determines that the swipe operation SW1, the swipe operation SW3, and the swipe operation SW2 represent an unbroken gesture by the same user.

Next, the controller 112 compares the direction D1, the direction D3, and the direction D2 of each of the swipe operations. In the event that, as a result of the comparison, the differences between angles represented by these directions are within a prescribed range, the controller 112 of the server device 100 determines that the swipe operation SW1, the swipe operation SW3, and the swipe operation SW2 were performed as an unbroken gesture by the same user. In the event that this decision is made, the controller 112 will decide that the first user intends to allow the second user and the third user to join the session.

Next, the controller 112 compares the position coordinates C1, the position coordinates C3, the position coordinates C4, and the position coordinates C2. Specifically, the side E1 over which the swipe operation SW1 passed while moving across the touch panel 212 of the terminal device 200-1 from the position coordinates C1, as well as the height L1 of passage across this side E1, the side E3 over which the swipe operation SW3 initially passed while moving across the touch panel 212 of the terminal device 200-3 from the position coordinates C3, as well as the height L3 of passage across this side E3, the side E4 over which the swipe operation SW3 finally passed while moving across the touch panel 212 of the terminal device 200-3 from the position coordinates C4, as well as the height L4 of passage across this side E4, and the side E2 over which the swipe operation SW2 passed while moving across the touch panel 212 of the terminal device 200-2 from the position coordinates C2, as well as the height L2 of passage across this side E2, are calculated, and these are compared.

Then, in the event that, as a result of the aforementioned comparison, the difference in height on opposed sides, i.e., height L1 and height L3, and height L4 and height L2, is decided to be within a prescribed range, it is decided that the first user intends to allow the second user and the third user to join the session.

Consequently, even supposing that the number of terminal devices 200 is increased, it will be possible to carry out the relationship information generation process by performing the aforementioned processes, and to produce the same effects as the first embodiment.

<Third Embodiment of the Present Invention>

In the present embodiment, unlike the first embodiment and the third embodiment, a relationship information generation process is executed by the terminal device 200-1, without the agency of the server device 100. In the present embodiment, except for the feature described in detail below, the configuration, processes, and procedures are the same as in the server device 100 and the terminal devices 200 of the first embodiment and the second embodiment. Accordingly, a detailed description of these matters shall be dispensed with.

[System 1C According to the Present Embodiment]

Figure 11:
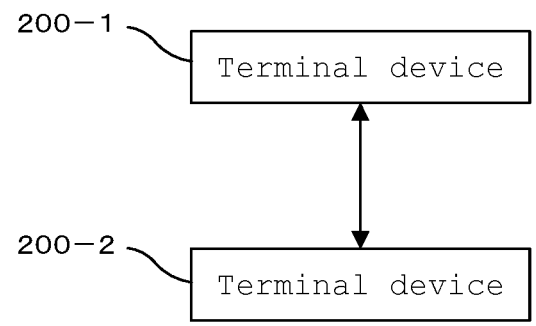
FIG. 11 is a diagram showing the configuration of a system 1C according to a third embodiment of the present invention.

FIG. 11 is a diagram showing the configuration of a system 1C according to a third embodiment of the present invention. In FIG. 11, in the system 1C according to the present embodiment, the terminal device 200-1 and the terminal device 200-2 are connected in communication-enabled fashion. The terminal device 200-1 carries out a relationship information generation process.

[Process Sequence]

Figure 12:
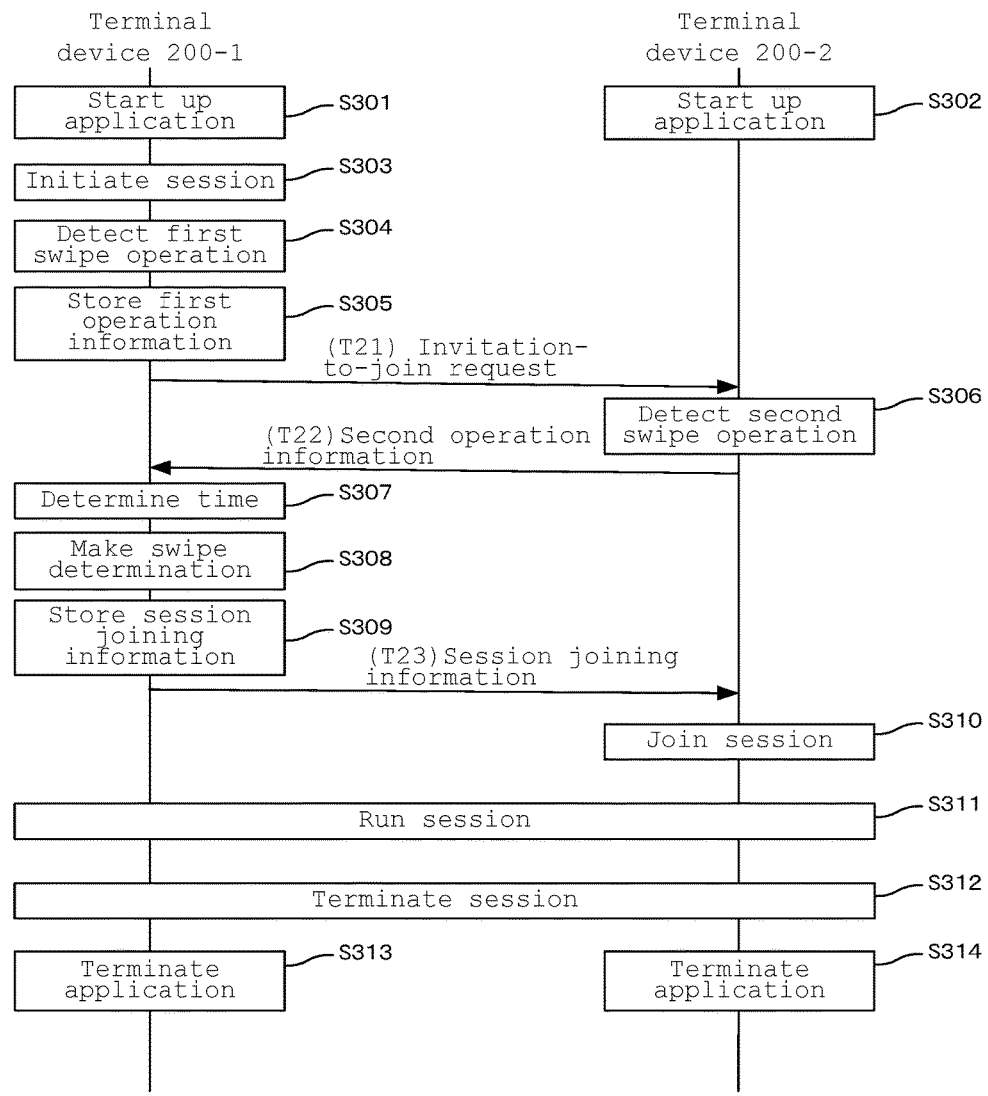
FIG. 12 is a diagram showing a process sequence carried out between a terminal device 200-1 and a terminal device 200-2 according to the third embodiment of the present invention.

FIG. 12 is a diagram showing a process sequence between the terminal device 200-1 and the terminal device 200-2. As in the example of FIG. 4, a case in which a first user and a second user advance in tandem through a prescribed session within a game application is described. The present embodiment differs from the example of FIG. 4 terms of the following feature. The application being run on the terminal device 200-1 is not yet being run on the terminal device 200-2. In the example of FIG. 4, an interval of time is measured by the timer in the timing unit 113 of the server device 100; in the present embodiment, however, information regarding the time at which a swipe operation took place (as an example, information regarding the start time or the end time of the swipe operation) is included in the first operation information and the second operation, and intervals of time are measured on the basis of the time information in question.

In FIG. 12, a prescribed game application is started up on the terminal device 200-1 operable by the first user (S301). Likewise, a prescribed game application is started up on the terminal device 200-2 operable by the second user (S302). In the first terminal device, in association with running of the game application in question, a prescribed session is initiated (S303), and a screen to verify whether to invite another user to join the session in question is displayed. Then, when the first user selects to issue an invitation to join, a screen prompting a swipe operation is displayed. Then, when the touch panel 212 of the terminal device 200-1 detects a swipe operation (first swipe operation SW1) (S304), first operation information that includes information regarding the time that the swipe operation in question was initiated on the terminal device 200-1 is generated, and is stored in the memory unit 216 of the terminal device 200-1 (S305). The terminal device 200-1 transmits to another terminal device situated within communication range an invitation-to-join request (T21) for the session, and stands by to receive second operation information from the other terminal device.

In the terminal device 200-2 having received the invitation-to-join request, when the touch panel 212 detects a swipe operation (second swipe operation) performed on the touch panel 212 (S306), second operation information that includes information regarding the time that the swipe operation in question was initiated on the terminal device 200-2 is generated. Then, on the basis of the received invitation-to-join request, the terminal device 200-2 identifies the terminal device 200-1 as the sender, and transmits the generated second operation information (T22) to the terminal device 200-1.

The terminal device 200-1 having received the second operation information extracts from the second operation information the time at which the second swipe operation was initiated, and compares this to initiation time of the first swipe operation, which is stored in the memory unit 216. From this comparison, the interval of time between the first swipe operation and the second swipe operation is calculated, and it is determined whether the interval of time lies within a prescribed range (e.g., 2 seconds) (S307). It is then decided whether the first swipe operation and the second swipe operation were made by a continuous unbroken operation by the same user.

Next, on the basis of information relating to the direction of the first swipe operation and information relating to the position coordinates at which contact of the pointer was last detected on the touch panel 212 of the terminal device 200-1, which is included in the first operation information, and information relating to the direction of the second swipe operation and information relating to the position coordinates at which contact of the pointer was first detected on the touch panel 212 of the terminal device 200-2, which is included in the second operation information, the terminal device 200-1 determines whether the whether the first swipe operation and the second swipe operation were made by a continuous unbroken operation by the same user (S308).

Next, in the event that the first swipe operation and the second swipe operation were made by a continuous unbroken operation by the same user, the terminal device 200-1 generates session joining information allowing the second user operating the terminal device 200-2 to join the session is generated as relationship information, and stored (S309). The terminal device 200-1 transmits the generated session joining information (T23) to the terminal device 200-2.

On the basis of the received session joining information, the terminal device 200-2 transitions to a process for running the allowed session, included in the game application that was started up in S302 (S310). Control enabling the first user and the second user to advance in tandem through the session then takes place in each terminal device (S311). Once the session is subsequently cleared, the session terminates (S312).

Once the session has terminated, after a process to update user information that has changed during running of the session in question in each of the terminal devices, the game application that was being run in the terminal devices is terminated (S313 and S314).

[Process Flow in Terminal Device 200-1]

Figure 13:
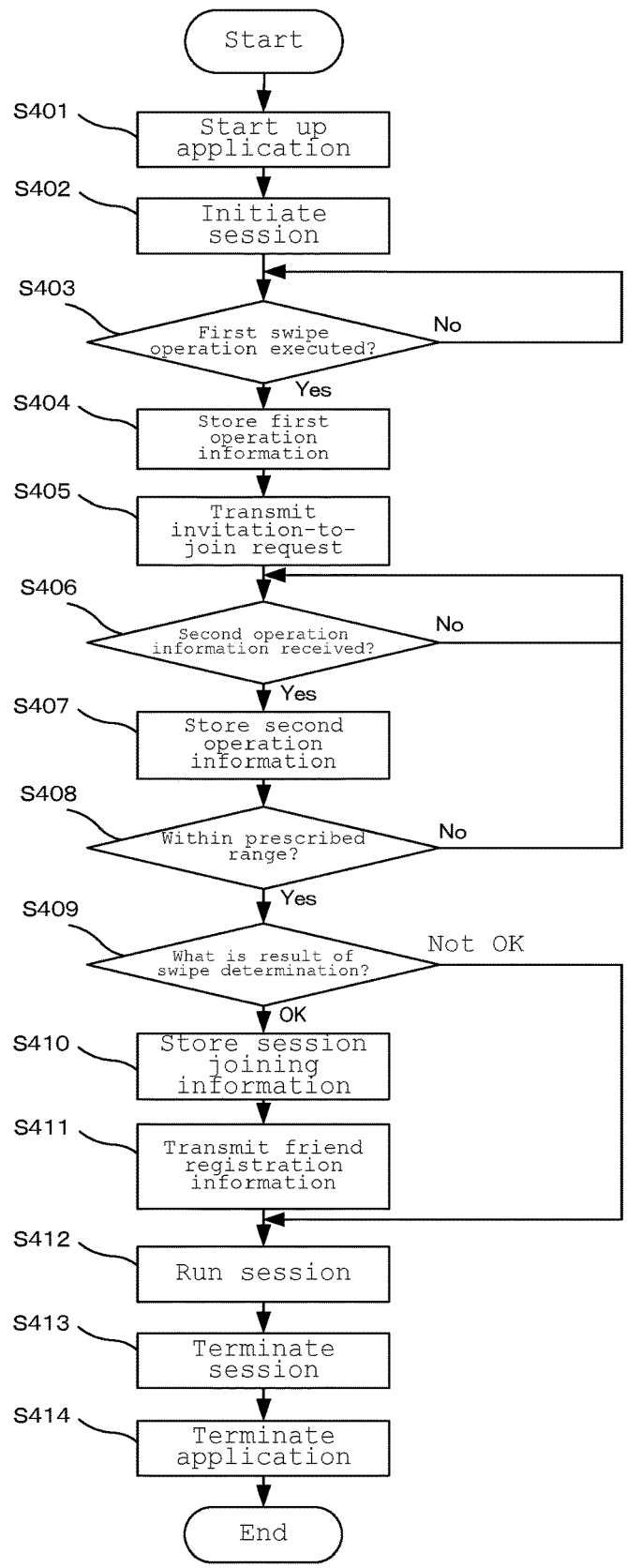
FIG. 13 is a diagram showing a process flow performed in the terminal device 200-1 according to the third embodiment of the present invention.

FIG. 13 is a diagram showing a process flow performed in the terminal device 200-1 according to the third embodiment, on the basis of a program for a relationship information generation process. Here, as in FIG. 12, a case of performing a process relating to a game application is described.

The controller 215 of the terminal device 200-1 starts up the game application on the basis of a command by the first user (S401), and initiates a prescribed session according to the advance of the game application in question (S402). The controller 215 then prompts the display unit 211 to display an invitation-to-join screen for inviting another terminal device to join the session in question, and stands by until a swipe operation is detected by the touch panel 212.

In the event that a swipe operation by the first user (first swipe operation) is detected on the touch panel 212 (S403), the controller 215 stores first operation information that includes information about the time the swipe operation in question took place, to the memory unit 216 (S404). The controller 215 also transmits to another terminal device within communication range an invitation-to-join request to inviting another to join the session currently being advanced (S405). The term "communication range" is not limited to a range in which direct communication with another terminal device is possible through Bluetooth™ or the like, and includes ranges in which communication is possible via a base station or the like, such as is the case with mobile wireless communications. Consequently, the other terminal within communication range may be any terminal device with which a call to join a session is possible, either directly or indirectly (e.g., a terminal device registered with a server device as a game application user terminal device).

While not explicitly illustrated, the terminal device 200-1 then stands by to receive second operation information according to a second swipe operation from the other terminal device, until a prescribed time limit (e.g., 30 seconds) is reached. Then, in the event that the second operation information is received within the time limit (S406), the controller 215 stores the received second operation information to the memory unit 216 (S407). On the other hand, in the event that the information is not received within the time limit, the controller 215 terminates standby, and transitions to running the session on the terminal device 200-1 independently (S412).

Once the second operation information is stored to the memory unit 216, the controller 215 calculates the interval of time between when the first swipe operation and the second swipe operation were performed, on the basis of the first swipe operation initiation time included in the first operation information, and the second swipe operation initiation time included in the second operation information. The controller 215 then determines whether the calculated interval of time lies within a prescribed range (S408). In the event of a determination that the interval lies within the prescribed range, the controller 215 determines that it is highly likely that the first swipe operation and the second swipe operation were performed though an unbroken operation by the same user. On the other hand, in the event of a determination that the interval does not lie within the prescribed range, the system transitions to running the session independently (S412).

The controller 215 compares information relating to the direction of the first swipe operation, information relating to the position coordinates at which contact by the pointer was last detected on the touch panel 212 of the terminal device 200-1, information relating to the direction of the second swipe operation, and information relating to the position coordinates at which contact by the pointer was first detected on the touch panel 212 of the terminal device 200-2, which information is included in the first operation information and the second operation information, and determines whether the first swipe operation and the second swipe operation were performed continuously, though an unbroken operation by the same user (S409).

When, as a result of the determination, it is decided that the first swipe operation and the second swipe operation were performed continuously though an unbroken operation by the same user, the controller 215 allows the second user to join the session. Session joining information for allowing the second user to join the session is generated as relationship information (S410). The controller 215 then performs control to transmit the generated session joining information to the terminal device 200-2 (S411).

Once advance of the session has also been initiated in the terminal device 200-2 on which the same game application as that on the first terminal device has already been started up, the controller 215 of the terminal device 200-1 performs the necessary processes for the session to advance in tandem with the second user (S412). The controller 215 then terminates the session in question according to the advance of the session (S413), performs a process to terminate the game application in accordance with the user's wishes (S414), and terminates the process flow in question.

As indicated above, in the present embodiment, in the same manner as in the first embodiment and the second embodiment, a determination is made utilizing the aforementioned information, in addition to a determination based on an interval of time, in order to generate relationship information, whereby it is possible to identify relationships with higher accuracy. Moreover, because the relationship information is generated on the basis of a swipe operation by the first user, it is possible to reduce the operational burden on the user when generating relationship information.

Further, in the present embodiment, information regarding the time that each of the swipe operations took place is included in the first and second operation information. It is therefore possible to execute the relationship information generation process, with a simpler configuration. Moreover, in cases in which the time of reception is utilized in calculating a interval of time, it is necessary to consider delay and the like due to the communication environment at the time of reception; however, in cases in which the time at which the swipe operations actually took place are utilized, this necessity is eliminated.

<Additional Embodiments>

1. Generating Positional Relationship Information Between Terminal Devices

In the first to third embodiments, cases in which information relating to whether to allow a second terminal device to join a specific session being advanced on a first terminal device is generated by way of relationship information were described. However, it would be possible to generate positional relationship information between terminal devices, instead of, or in addition to, the information in question.

Figure 14:
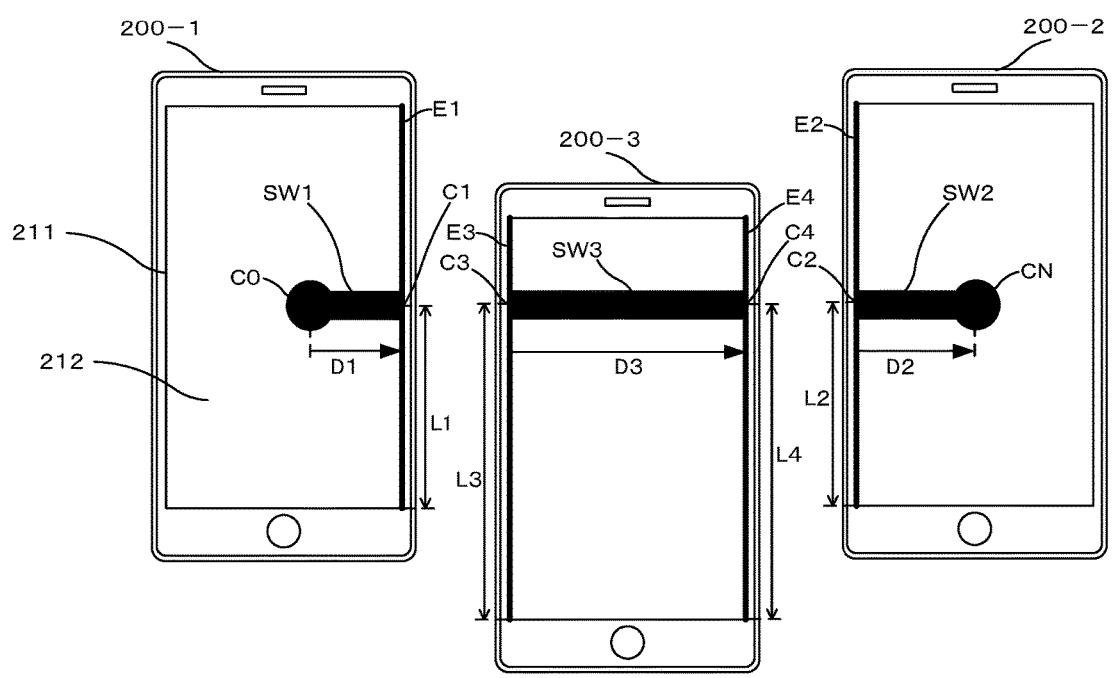
FIG. 14 is a conceptual diagram showing an application example of a system according to another embodiment of the present invention.

FIG. 14 is a conceptual diagram showing an application example of a system according to another embodiment of the present invention. First operation information, second operation information, and third operation information are generated in the terminal devices is generated by the same processes and procedures as in the application example of FIG. 10. However, the example differs from the application example of FIG. 10 in that the position of the terminal device 200-3 is shifted vertically.

By comparing the interval of time between a swipe operation SW1 and a swipe operation SW3, and the interval of time between the swipe operation SW1 and a swipe operation SW2, which intervals have been calculated on the basis of the operation information, it is possible for the server device 100 to decide which, of the terminal device 200-2 and the terminal device 200-3, is the device that is closer to the terminal device 200-1 on which the swipe operation SW1 took place. In this case, the device for which the interval of time is shorter will be decided to be the one that is closer to the terminal device 200-1.

Information regarding the operation by which position coordinates were detected is also included, in corresponding fashion to each of the position coordinates. In FIG. 14, C1 is stored as the position coordinates at which contact by the pointer was last detected in the course of the swipe operation SW1, C3 as the position coordinates at which contact was first detected in the course of the swipe operation SW3, C4 as the position coordinates at which contact by the pointer was last detected in the course of the swipe operation SW3, and C2 as the position coordinates at which contact was first detected in the course of the swipe operation SW2, respectively. Consequently, it can be decided that the position coordinates were input in the order C1, C3, C4, C2, and ascertained that sides E1 and E3, to which the first and second coordinates C1 and C3 belong, and sides E4 and E2, to which the third and fourth coordinates C4 and C2 belong, are in respectively opposed positional relationships. In so doing, it is possible to ascertain the orientation of the other terminal devices with respect to the terminal device 200-1.

Further, because the height L1-L4 at each side can be calculated from the position coordinates, it is possible to ascertain shifting of the terminal devices in the vertical direction, from the calculated heights.

It is possible for such positional relationship information to be utilized, for example, in a game application, for a process in which an enemy character is displayed on the terminal device positioned at the middle, friendly characters are displayed on the terminal devices positioned surrounding it, and a single virtual space is shared among the terminal devices. It would then be possible for the users of the surrounding terminal devices to mount an attack on the character displayed on the terminal device positioned at the middle, by inputting swipe operations to these devices, in the direction of the terminal device positioned at the middle.

2. Relationship Information

In the first to third embodiments, information relating to whether to allow a second user to join a specific session advancing on a first terminal device was described as the relationship information. However, it would be possible to utilize the various kinds of information cited by way of example in the preceding "Overview of the several embodiments of the present invention," as relationship information.

3. Intervals of Time Between Swipe Operations

With regard to intervals of time between swipe operations, in the first embodiment and the second embodiment, these intervals are calculated by utilizing the timer of the timing unit 113, whereas in the third embodiment, intervals are calculated by utilizing information regarding the time that the swipe operations took place, which information is included in the operation information. However, it would be possible, in the first embodiment and the second embodiment, to instead utilize information regarding the time that the swipe operations took place, or in the third embodiment, to instead utilize the timer of the timing unit 222.

4. Application

In the first to third embodiments, cases of application of the relationship information generation process to a game application are described. However, there is no limitation to game applications, and it would be possible for the relationship information generation process in question to be applied to various other applications, such as an SNS application, a contact list application, or the like. For example, the relationship information generation process according to the present invention can be utilized during friend registration in a SNS application.

5. Swipe Operation

In the first to third embodiments, cases in which the first user holding the terminal device 200-1 inputs a swipe operation in such a way as to cross over to another terminal device is described. However, it would be possible for the swipe operation on the touch panel 212 of the terminal device 200-1 and the swipe operation on the touch panel 212 of the other terminal device to be respectively performed by different users.

For example, an agreement to run a relationship information generation process may be shared in advance between users, with the users themselves inputting swipe operations to the terminal devices which they are holding, at prescribed timing. Specifically, when it is desired to allow a user at a remote location to join a session, the timing for inputting the swipe operations is arranged in advance by phone or the like, the respective swipe operations are input, and the relationship information generation process is run. In this case, operation information relating to position coordinates and the like would not always be necessary. In so doing, it is possible, for example, to provide novel variety not encountered in the past when joining a session in a video game.

It is not necessary for the timing for input of swipe operations to be arranged in advance by phone or the like, in the manner described above. For example, when an unspecified large number of users are running the same application, it would be possible for a server device to manage and process batches of operation information relating to swipe operations transmitted from terminal devices, and utilizing the time information of the swipe operations included in the operation information, to perform authentication (friend registration and the like) among all users or terminals for which intervals of time are included within a given time. In so doing, acquaintance can be made with an unspecified large number of other previously unknown users, making it possible to provide novel variety.

6. Relationship Information Generation Process

In the first to third embodiments, information indicating that a swipe operation took place, the time at which a swipe operation took place, the direction of the swipe operation, coordinate information, and the like are detected by way of operation information. This information is then employed to compare intervals of time between swipe operations, the direction thereof, and the height thereof at each side, and relationship information is generated (see FIG. 7). However, it would be possible to include the speed of the swipe operations in the aforedescribed operation information as well. Then, when the speed of the swipe operations has been detected, this information can be combined with intervals of time and the like, and relationship information generated. In so doing, it is possible to further improve the accuracy with which relationship information is generated.

Specifically, the first operation information relating to the first swipe operation performed on the first terminal device 200-1 includes information relating to the speed at which the first swipe operation was performed. The second operation information relating to the second swipe operation performed on the second terminal device 200-2 includes information relating to the speed at which the second swipe operation was performed. During the relationship information generation process, the swipe operation speeds included in the operation information are compared, and in the event that the difference in speed is within a prescribed range, it is decided to be highly likely that the swipe operations in question were performed through an unbroken operation by the same user, and relationship information is generated on the basis of this decision. On the other hand, in the event that the difference in speed is not within the prescribed range, it is decided that the swipe operations in question were not performed through an unbroken operation by the same user, and relationship information is generated on the basis of this decision.

In the first to third embodiments, from the position coordinates of the swipe operations, the heights ($L1$, $L2$, ...) at sides of the touch panels of the terminal devices are compared, in order to generate relationship information. While it is possible to utilize the absolute coordinate value at which a swipe operation is detected on the touch panel as the height in question, it would also be possible to utilize relative positional relationships on the aforementioned sides. The utilization of relative positional relationships would be more effective, for example, in cases in which terminal devices having display units and touch panels of differing resolution. The aforementioned relative positional relationships could be represented, for example, by $Yt/Y1-Y0$, where it is assumed that a swipe operation is detected at $Yt$, on a side the Y coordinates of which are represented by $Y0-Y1$.

The processes and procedures have been described in the present Description merely for illustrative purposes in the embodiments, and may be realized through software, hardware, or some combination thereof. Specifically, the processes and procedures described in the present Description may be realized by installing logic that corresponds to the processes in question, on media such as integrated circuits, volatile memory, nonvolatile memory, magnetic disks, optical storage, and the like. It is also possible for the processes and procedures described in the present Description to be realized by installing these processes/procedures in computer program form, for execution by computers of various types including terminal devices and server devices.

Even where the processes and procedures are described in the present Description as being executed by a single device, software program, component, or module, such processes and procedures can also be executed by multiple devices, multiple software programs, multiple components, and/or multiple modules. Even where the various information described in the present Description is described as being stored in a single memory unit or storage unit, such information can be stored in distributed fashion in multiple memory units provided to a single device, or in multiple memory units distributed among multiple devices. The software and hardware elements described in the present Description can be consolidated into a smaller number of constituent elements, or divided up into a greater number of constituent elements.

This application is based upon and claims priority to International Application No. PCT/JP2015/068670 filed on Jun. 29, 2015, entitled "SERVER DEVICE", the entire contents of which are hereby incorporated herein by reference.

SYMBOL KEY

100 Server device
112 Controller
113 Timing unit
200 Terminal device
200-1 Terminal device
200-2 Terminal device
200-3 Terminal device
212 Touch panel
215 Controller
216 Memory unit

What is claimed is:

1. A server device, comprising:
a communication circuit configured to communicate with a first terminal device having a first touch panel associated with a first user, said communication circuit further configured to communicate with a second terminal device having a second touch panel associated with a second user different from the first user; and
a hardware processor configured to:
receive a first operation information via the communication circuit corresponding to a first swipe operation performed on the first touch panel;
receive second operation information via the communication circuit corresponding to a second swipe operation performed on the second touch panel;
determine whether an interval of time that is identified based on the received first operation information and the received second operation information falls within a prescribed range, and
generate a prescribed relationship information on the basis of the result of the determination,
wherein the prescribed relationship information comprises information that indicates a relationship between the first terminal device and the second terminal device, or between the first user operating the first terminal device and the second user operating the second terminal device; and
wherein the first operation information comprises information relating to a first speed at which the first swipe operation was performed, the second operation information comprises information relating to a second speed at which the second swipe operation was performed, and the controller compares the first speed with the second speed and generates the prescribed relationship information on the basis of the result of the comparison.

2. The server device according to claim 1, wherein the prescribed relationship information is information that relates to authentication of the second user operating the second terminal device, by the first user operating the first terminal device.

3. The server device according to claim 1, wherein the first terminal device and the second terminal device run a prescribed application which comprises multiple sessions, and in which the sessions can be advanced by the first user and the second user in tandem, and
the prescribed relationship information is information for allowing the second user to join the session advancing on the first terminal device, in order for the second user to advance the session in tandem with the first user.

4. The server device according to claim 1, wherein the prescribed relationship information is information relating to the positional relationship between the first terminal device and the second terminal device.

5. The server device according to claim 1, wherein the first operation information comprises information relating to the direction in which the first swipe operation was performed, the second operation information comprises information relating to the direction in which the second swipe operation was performed, and the controller compares the direction in which the first swipe operation was performed and the direction in which the second swipe operation was performed, and generates the prescribed relationship information on the basis of the result of the comparison.

6. The server device according to claim 1, wherein the first operation information comprises information relating to the position at which the first swipe operation was performed, the second operation information comprises information relating to the position at which the second swipe operation was performed, and the controller compares the position at which the first swipe operation was performed and the position at which the second swipe operation was performed, and generates the prescribed relationship information on the basis of the result of the comparison.

7. The server device according to claim 1, wherein the first swipe operation and the second swipe operation are both operations performed by the first user.

8. A terminal device, comprising:
a first touch panel associated with a first user;
a communication circuit configured to communicate with another terminal device having a second touch panel associated with a second user different from the first user; and
a hardware processor configured to:
determine whether an interval of time that is identified based on first operation information corresponding to a first swipe operation performed on the first touch panel, and second operation information received from the other terminal device via the communication circuit and corresponding to a second swipe operation performed on the second touch panel, falls within a prescribed range, and
generate a prescribed relationship information on based on the determination,
wherein the prescribed relationship information comprises information that indicates a relationship between the first terminal device and the second terminal device, or between the first user operating the first terminal device and the second user operating the second terminal device; and
wherein the first operation information comprises information relating to a first speed at which the first swipe operation was performed, the second operation information comprises information relating to a second speed at which the second swipe operation was performed, and the controller compares the first speed with the second speed and generates the prescribed relationship information on the basis of the result of the comparison.

9. A non-transitory computer-readable medium in which a computer is stored, the computer program causing a computer to:
communicate with a first terminal device having a first touch panel associated with a first user, and with a second terminal device having a second touch panel associated with a second user different from the first user; and determine whether an interval of time that is identified based on a first operation information received from the first terminal device via a communication circuit and corresponding to a first swipe operation performed on the first touch panel, and second operation information received from the second terminal device via the communication circuit and corresponding to a second swipe operation performed on the second touch panel, falls within a prescribed range, and generate prescribed relationship information on the basis of the result of the determination, wherein the prescribed relationship information comprises information that indicates a relationship between the first terminal device and the second terminal device, or between the first user operating the first terminal device and the second user operating the second terminal device; and wherein the first operation information comprises information relating to a first speed at which the first swipe operation was performed, the second operation information comprises information relating to a second speed at which the second swipe operation was performed, and the controller compares the first speed with the second speed and generates the prescribed relationship information on the basis of the result of the comparison.

10. A method for generating prescribed relationship information in a server device that is connected, via a communication circuit, to a first terminal device having a first touch panel associate with a first user, and to a second terminal device having a second touch panel associated with a second user different from the first user, wherein the method comprises:

determining, at the server device, whether an interval of time that is identified on the basis of first operation information received from the first terminal device via the communication circuit and corresponding to a first swipe operation performed on the first touch panel, and second operation information received from the second terminal device via the communication circuit and corresponding to a second swipe operation performed on the second touch panel, falls within a prescribed range; and generating the prescribed relationship information on the basis of the result of the determination, wherein the prescribed relationship information comprises information that indicates a relationship between the first terminal device and the second terminal device, or between the first user operating the first terminal device and the second user operating the second terminal device; and wherein the first operation information comprises information relating to a first speed at which the first swipe operation was performed, the second operation information comprises information relating to a second speed at which the second swipe operation was performed, and the controller compares the first speed with the second speed and generates the prescribed relationship information on the basis of the result of the comparison.

* * * * *